No. 772,161. PATENTED OCT. 11, 1904.
C. E. LONGDEN.
SPINDLE FOR FORMING RUBBER NIPPLES.
APPLICATION FILED JULY 5, 1904.
NO MODEL.

No. 772,161. Patented October 11, 1904.

UNITED STATES PATENT OFFICE.

CHARLES E. LONGDEN, OF HAMDEN, CONNECTICUT, ASSIGNOR TO THE FALCON RUBBER CO., OF NEW HAVEN, CONNECTICUT, A CORPORATION.

SPINDLE FOR FORMING RUBBER NIPPLES.

SPECIFICATION forming part of Letters Patent No. 772,161, dated October 11, 1904.

Application filed July 5, 1904. Serial No. 215,427. (No model.)

*To all whom it may concern:*

Be it known that I, CHARLES E. LONGDEN, of Hamden, in the county of New Haven and State of Connecticut, have invented a new and useful Improvement in Spindles for Forming Rubber Nipples; and I do hereby declare the following, when taken in connection with the accompanying drawings and the letters of reference marked thereon, to be a full, clear, and exact description of the same, and which said drawings constitute part of this specification, and represent, in—

Figure 1:
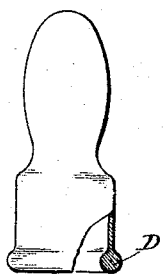
Figure 2:
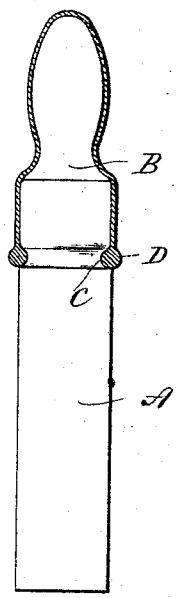
Figure 3:
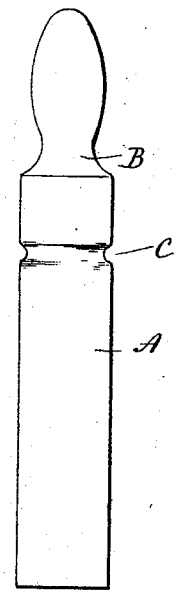

Figure 1, a side view of a nipple constructed on a spindle in accordance with my invention, partially broken away at the open end; Fig. 2, a side view of a spindle constructed in accordance with my invention, showing a sectional view of the nipple thereon; Fig. 3, a side view of a spindle with the nipple removed.

This invention relates to an improvement in spindles for forming rubber nipples.

In the construction of so-called "seamless" nipples a spindle is employed corresponding in form to the form of the nipple, and this spindle is repeatedly dipped in soluble rubber until the desired thickness is obtained. The upper end of the rubber is then rolled downward to form a rib at the mouth of the nipple, but entirely upon the exterior surface thereof. To enable the nipple to more closely grip upon the neck of the bottle, it is desirable that the rib should project inward to a certain extent from the inner surface of the nipple.

The object of this invention is to form spindles whereby nipples having an inwardly-extending rib may be readily produced; and the invention consists in the construction as hereinafter described, and particularly recited in the claim.

In carrying out my invention I employ a spindle A, formed at its outer end corresponding to the form of the desired nipple. As herein shown, it is formed with a reduced neck B. Upon the spindle and at a point corresponding to the mouth of the nipple is an annular groove C. This spindle, or a series of these spindles, is dipped in rubber until a coating is applied at the desired thickness, the dipping extending to a point somewhat beyond the groove C. At the proper time the rubber on the spindle A is rolled upon itself and into the groove C. This rolling produces an annular rib D at the mouth of the nipple, the rubber extending inward from the inner face of the nipple and partially outward beyond the exterior face of the nipple, as clearly shown in Figs. 1 and 2. By thus providing the spindle with a groove I not only provide the nipple with a groove extending inward from the inner face, but the groove also forms a guide for the operator in forming the rib, so that the nipples are always of the same length, and therefore give a better appearance when packed in boxes for the market than when they vary in length, as they must to a certain extent when there is no other guide than the eye to determine the extent to which the rubber shall be rolled to form the rib.

Having fully described my invention, what I claim as new, and desire to secure by Letters Patent, is—

A spindle for forming nipples provided with an annular groove into which the rubber may be rolled to form the open end of the nipple, and whereby the nipple may be provided with a rib projecting inward from its inner face, substantially as described.

In testimony whereof I have signed this specification in the presence of two subscribing witnesses.

CHARLES E. LONGDEN.

Witnesses:
FREDERIC C. EARLE,
CLARA L. WEED.